US008465088B2

(12) United States Patent
Bodin et al.

(10) Patent No.: US 8,465,088 B2
(45) Date of Patent: Jun. 18, 2013

(54) A-PILLAR FOR A VEHICLE

(75) Inventors: Hans Bodin, Sodra Sunderbyn (SE); Jan Krispinsson, Lulea (SE); Paul Akerstrom, Luluu (SE); Daniel Berglund, Norrjarden (SE); Lars Wikstrom, Sodra Sunderbyn (SE); Martin Holmberg, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 0 days.

(21) Appl. No.: 13/261,321

(22) PCT Filed: Dec. 11, 2010

(86) PCT No.: PCT/SE2010/000295
§ 371 (c)(1),
(2), (4) Date: Jun. 11, 2012

(87) PCT Pub. No.: WO2011/071433
PCT Pub. Date: Jun. 16, 2011

(65) Prior Publication Data

US 2012/0319432 A1 Dec. 20, 2012

(30) Foreign Application Priority Data

Dec. 13, 2009 (SE) .................................... 0901549-6

(51) Int. Cl.
*B60R 27/00* (2006.01)

(52) U.S. Cl.
USPC ................................ 296/193.06; 296/187.12

(58) Field of Classification Search
USPC ....................................... 296/193.06, 187.12
See application file for complete search history.

(56) References Cited

U.S. PATENT DOCUMENTS 5,972,134 A 10/1999 Buschsieweke et al.
6,962,389 B2 * 11/2005 Katsuma .................. 296/187.12
7,278,287 B2 10/2007 Bohner et al.
7,678,208 B2 * 3/2010 Bodin ........................... 148/648

FOREIGN PATENT DOCUMENTS

WO WO2009/123538 10/2009

* cited by examiner

*Primary Examiner* — Joseph Pape
(74) *Attorney, Agent, or Firm* — Mark P. Stone

(57) ABSTRACT

An A-pillar for a vehicle includes a first part (15) extending as far as the windscreen and supporting the door hinges and a second arcuate part (16) extending up along the windscreen and continuing towards the back in order to serve as a roof beam (19) above the door. This second part consists of two open sections (23, 24) with flanges (25, 26; 27, 28) welded together so as to give the pillar a closed profile. At least one of the sections (23) is press-hardened and has a breaking strength in excess of 1400 MPa and the flanges (25, 26; 27, 28) of the sections have a breaking strength below 1100 MPa in a portion (35) situated above the door.

20 Claims, 2 Drawing Sheets

26
28
38
23
24
30
37
27
25

11
12
13
14
15
16
17
19
20
35
36
2
2

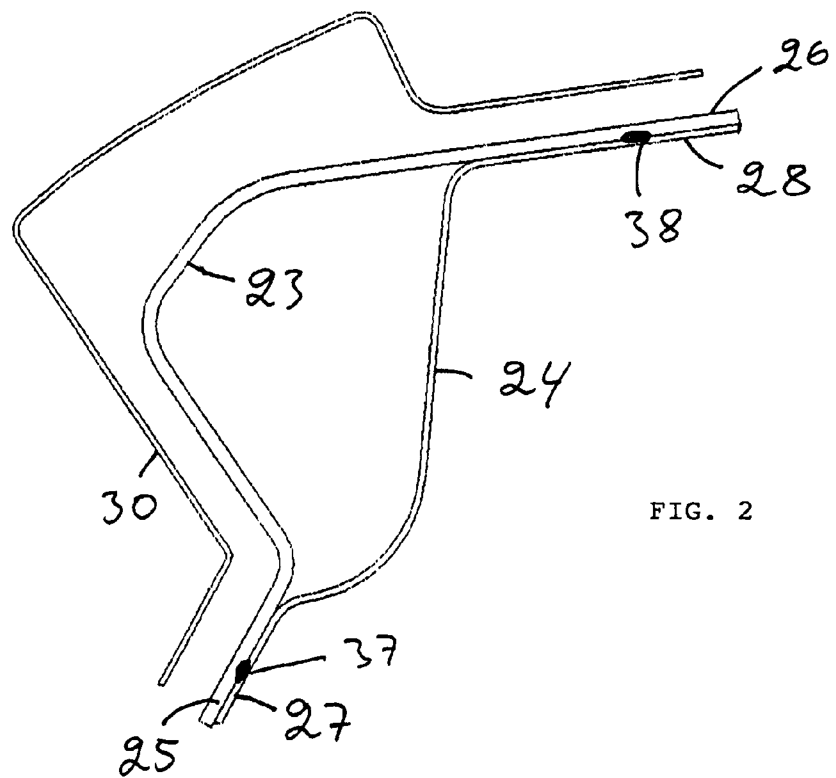
FIG. 2
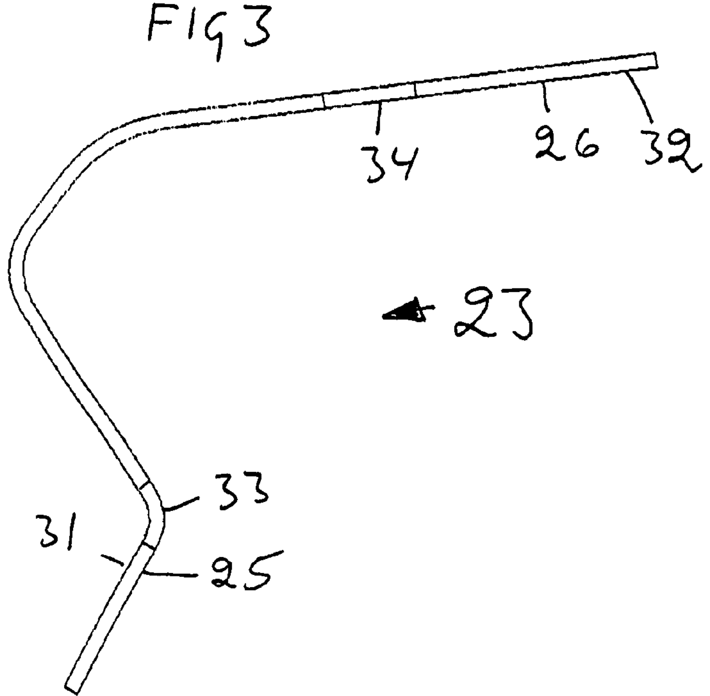

A-PILLAR FOR A VEHICLE

TECHNICAL FIELD OF THE INVENTION

The invention relates to an A-pillar for a vehicle including a first part extending as far as the windscreen and supporting the door hinges and a second arcuate part extending along the windscreen and continuing towards the back in order to serve as a roof beam above the door, the said second part consisting of two sections with longitudinal flanges arranged in pairs and welded together so as to form a closed profile.

BACKGROUND OF THE INVENTION

The pillar from which the front door of a vehicle is normally suspended is referred to as an A-pillar. This pillar extends up along the windscreen and is connected to the roof beam above the doors. In the event of a lateral collision, the passenger is protected by the door, as well as by the A-pillar in front of the door, the B-pillar behind the door, the sill member below the door and the roof beam above the door. B-pillars the edges of which are trimmed after forming and hardening are known from U.S. Pat. No. 7,278,287 B2. The pillars are manufactured with soft edges in order to reduce the wear of the edge-trimming tool.

AIM OF THE INVENTION AND BRIEF DESCRIPTION OF THE INVENTION

One aim of the invention is to improve the protection for passengers in the event of a lateral collision against the front door. This is achieved in that at least one of the sections forming the A-pillar is press-hardened and has a breaking strength in excess of 1400 MPa and both of the flanges in at least one pair of flanges welded together have a breaking strength below 1100 MPa in a portion situated above the door. This increases the protection for the passenger closest to the door. The invention is defined by the claims.

BRIEF DESCRIPTION OF THE DRAWINGS

FIG. 2 is a section along the line 2-2 of FIG. 1.

FIG. 3 shows one of the components shown in FIG. 2.

DETAILED DESCRIPTION OF ILLUSTRATED EMBODIMENT OF THE INVENTION

Figure 1:
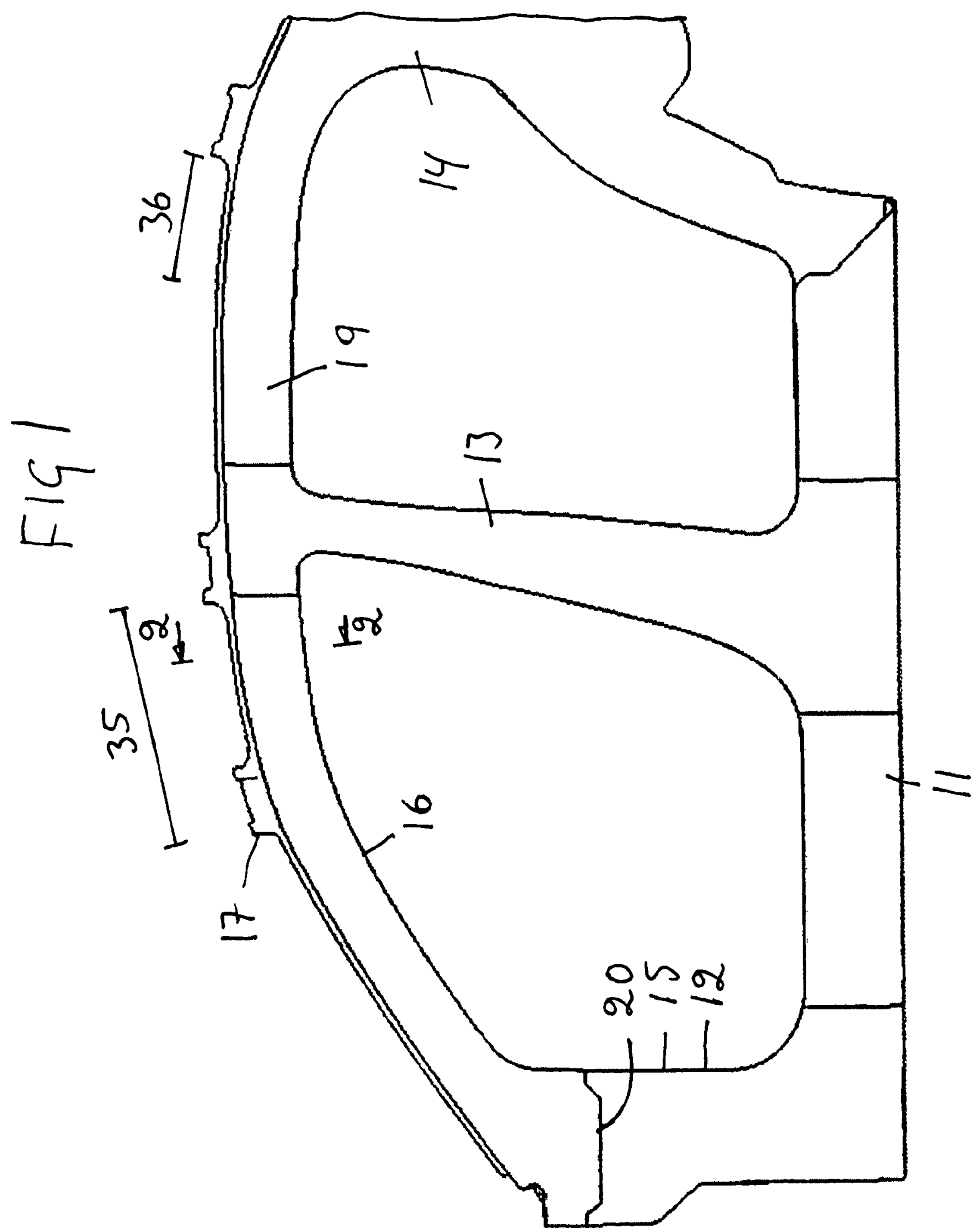
FIG. 1 is a side view of the central part of the load-bearing part of a passenger car.

FIG. 1 is a diagram showing the load-bearing parts of one side of a vehicle with a sill member 11 to which an A-pillar 12, a B-pillar 13 and a C-pillar 14 are welded. The A-pillar has a lower part 15 adapted to support the hinges of the front door. This lower part is welded to an upper part 16 extending up along the windscreen and a cross member 17 above the windscreen is welded between the A-pillars of both sides. The upper part 16 of the A-pillar extends upwards in an arcuate manner in order to serve as a roof beam 19 welded to the B-pillar 13 and continuing to the C-pillar 14. The upper part 16, 19 of the A-pillar can be manufactured in one piece and is welded to the lower part 15 of the A-pillar at 20. Alternatively, it may be manufactured in two or more parts and joined by welding.

As shown in FIG. 2, the upper part 16, 19 of the A-pillar consists of two open sections 23, 24 of sheet steel, the outer longitudinal parts of which form flanges 25, 26 and 27, 28 welded together in pairs by spot welding (spot welds 37,38) so as to give the pillar a closed profile. All of the load-bearing side of the car shown in FIG. 1 is covered by an outer panel 30 only indicated in FIG. 2 and spot-welded to the A-pillar and to other load-bearing parts.

FIG. 3 shows the section 23. It is manufactured by press hardening, i.e. it is hot-formed and hardened from a flat blank of boron steel in one step in cooled forming tools. It is hardened to a breaking strength in excess of 1400 MPa, but certain parts of its flanges 25, 26 are not fully hardened and have a breaking strength below 1100 MPa. It may advantageously be between 500 and 1000 MPa. This reduced strength can be achieved in various ways, e.g. by heating part of the surfaces of the tool pair bearing against the flanges, while cooling the remaining parts of the tool pair. The outer parts 31, 32 of the flanges have the desired reduced breaking strength and have transition zones 33, 34 to fully hardened material. The section 23 may advantageously have a sheet thickness of 1-1.5 mm.

The other section 24 can be manufactured in the same manner with the same high strength and the same lower strength in the flanges. However, this section 24 may also be cold-formed in a steel having a strength below 1100 MPa, e.g. with a strength of 500-1000 MPa. Flanges welded together in pairs advantageously have approximately the same strength and ductility. The section 24 may have a smaller sheet thickness than the section 23, particularly if it is cold-formed.

The flanges 25, 26 have this lower strength in the region shown by the line 35 between the region for the attachment of the cross member 17 and the region for the attachment of the B-pillar 13. The flanges may also have this lower strength in a portion immediately in front of the C-pillar of the vehicle, as shown by the reference numeral 36, in order to protect the head of the back seat passenger. Other parts of the flanges may advantageously be fully hardened.

In the event of a lateral collision against a pillar or a tree hitting the front door, the lower strength and greater ductility of the flanges reduces the risk of crack formation leading to fracture of the A-pillar before it has absorbed the maximum amount of energy by plastic deformation, thereby improving the protection for the passenger sitting beside the door. The same thing applies to the back seat passenger if the flanges have a soft zone in front of the C-pillar.

The invention claimed is:

1. A-pillar for a vehicle including a first part (15) extending as far as a windscreen and supporting door hinges and a second arcuate part (16) extending up along the windscreen and continuing towards the back of the vehicle in order to serve as a roof beam (19) above the door, the second part formed from two sections (23, 24) each having a longitudinal flange at each end of each said section (25, 26; 27, 28) said longitudinal flanges on one said section being welded to said longitudinal flanges on said other section so as to form a closed profile, characterised in that at least one of the sections (23) is press-hardened and has a breaking strength in excess of 1400 MPa, and both of the flanges in at least one pair of flanges (25, 26; 27, 28) welded together have a breaking strength uniformly below 1100 MPa in a region (35) situated above the door.

2. A-pillar according to claim 1, characterised in that the breaking strength of the flanges (25-28) in the said region (35) is between 500 and 1000 MPa.

3. A-pillar according to claim 1, characterised in that said vehicle includes a B-pillar and a cross member above the windscreen, and that said region (35) extends between a connection of the B-pillar (13) to the A-pillar (16) and a connection of the cross member (17) above the windscreen to the A-pillar.

4. A-pillar according to claim 1, characterised in that said at least one section (23) is hat-shaped and is press-hardened and the other (24) section is cold-formed.

5. A-pillar according to claim 1, characterised in that both of said sections are hat-shaped sections (23, 24) and press-hardened.

6. A-pillar according to claim 1, characterised in that both flanges in both pairs of flanges (25, 26; 27, 28) welded together have a breaking strength uniformly below 1100 MPa at least in the region (35) situated above the door.

7. A-pillar according to claim 1, characterised in that said other pair of flanges welded together have a breaking strength in excess of 1400 MPa in the region (35) situated above the door.

8. A-pillar according to claim 7, characterised in that the other pair of flanges welded together have a breaking strength in excess of 1400 MPa in the region (35) situated above the door and in a portion in front of a C-pillar of the vehicle.

9. A-pillar according to claim 1, characterised in that said vehicle includes a cross member above the windscreen, and the region (35) situated above the door extends from a region for the attachment of a cross member above the windscreen to a region for the attachment of a B-pillar.

10. A-pillar according to claim 2, characterised in that both flanges in both pairs of flanges (25, 26; 27, 28) welded together have a breaking strength uniformly below 1100 MPa at least in the region (35) situated above the door.

11. A-pillar according to claim 3, characterised in that both flanges in both pairs of flanges (25, 26; 27, 28) welded together have a breaking strength uniformly below 1100 MPa at least in the region (35) situated above the door.

12. A-pillar according to claim 4, characterised in that both flanges in both pairs of flanges (25, 26; 27, 28) welded together have a breaking strength uniformly below 1100 MPa at least in the region (35) situated above the door.

13. A-pillar according to claim 2, characterised in that the other pair of flanges welded together have a breaking strength in excess of 1400 MPa in the region (35) situated above the door.

14. A-pillar according to claim 3, characterised in that the other pair of flanges welded together have a breaking strength in excess of 1400 MPa in the region (35) situated above the door.

15. A-pillar according to claim 4, characterised in that the other pair of flanges welded together have a breaking strength in excess of 1400 MPa in the region (35) situated above the door.

16. A-pillar according to claim 2, characterised in that the other pair of flanges welded together have a breaking strength in excess of 1400 MPa in the region (35) situated above the door and in a portion in front of a C-pillar of the vehicle.

17. A-pillar according to claim 3, characterised in that the other pair of flanges welded together have a breaking strength in excess of 1400 MPa in the region (35) situated above the door and in a portion in front of a C-pillar of the vehicle.

18. A-pillar according to claim 4, characterised in that the other pair of flanges welded together have a breaking strength in excess of 1400 MPa in the region (35) situated above the door and in a portion in front of a C-pillar of the vehicle.

19. A-pillar according to claim 2, characterised in that said vehicle includes a cross member above the windscreen, and the region (35) situated above the door extends from a region for the attachment of the cross member above the windscreen to a region for the attachment of a B-pillar.

20. A-pillar according to claim 3, characterised in that said vehicle includes a cross member above the windscreen, and the region (35) situated above the door extends from region for the attachment of the cross member above the windscreen to a region for the attachment of a B-pillar.

* * * * *